(12) United States Patent
Ohkubo et al.

(10) Patent No.: US 6,170,988 B1
(45) Date of Patent: *Jan. 9, 2001

(54) SELF-ACTING AIR BEARING APPARATUS

(75) Inventors: Katsuyuki Ohkubo, Sagamihara; Yuzuru Kudoh, Atsugi; Kenichi Hiratsuka, Funabashi, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/717,242

(22) Filed: Sep. 20, 1996

(30) Foreign Application Priority Data

Sep. 20, 1995 (JP) .................................................. 7-241905

(51) Int. Cl.[7] ...................................................... F16C 17/02
(52) U.S. Cl. .......................... 384/114; 384/912; 384/913
(58) Field of Search ..................................... 384/104, 112, 384/107, 114, 912, 913

(56) References Cited

U.S. PATENT DOCUMENTS

| 3,806,209 | * | 4/1974 | Laing et al. | 384/104 |
|---|---|---|---|---|
| 5,356,162 | * | 10/1994 | Aiyoshizawa et al. | 384/112 |
| 5,366,298 | * | 11/1994 | Toshimitsu et al. | 384/107 |

* cited by examiner

Primary Examiner—Lenard A. Footland
(74) Attorney, Agent, or Firm—Oblon, Spivak, McClelland, Maier & Neustadt, P.C.

(57) ABSTRACT

A self-acting air bearing wherein an abrasion-generated substance is generated by rotation of a shaft and a bearing and is used as a lubricant. As a result, a motor of low cost and stable rotation in which it is not necessary to insert special lubricant into the shaft or the bearing previously can be achieved. Moreover, in a polygon motor having such a lubrication structure, since polluting of a writing system is not feared, reliability for a long time period can be obtained.

15 Claims, 3 Drawing Sheets

SELF-ACTING AIR BEARING APPARATUS

BACKGROUND OF THE INVENTION

1. Field of the Invention

The present invention relates to a self-acting air bearing which is used in a polygon motor mounted in an optical writing system, such as a digital copying machine, a digital facsimile, laser printer, etc., and particularly relates to a self-acting air bearing used in a polygon motor of aluminum alloy.

2. Discussion of the Background

In a polygon motor mounted in an optical writing system in a digital copying machine, as an example, a self-acting air bearing is often used in order to achieve stable and high speed copying. In this self-acting air bearing, liquid lubrication is maintained ordinarily. However, when rotating starts or stops or the machine is shocked, a shaft and a bearing directly contact each other, and serious damage such as baking is caused in some cases.

In order to prevent such a catastrophe, lubricant oil is often used in the air bearing. However, if the oil is used in a copying machine, it may be scattered into an optical writing system and writing performance can be seriously degraded, and therefore the lubricant oil is not used in the polygon motor. Thus, background solutions are that a solid lubricant is used in at least one of the shaft and the bearing, that a high abrasion resistance material is coated on surfaces of the shaft and/or bearing, or that oil leak is prevented by a magnetic liquid. More specifically, as examples of these solutions, BN composite plating is processed on a contacting surface of the bearing for lubrication (see Japanese Laid Open Patent No. 1986-112818), SiC composite plating is processed on a rotating shaft for high abrasion resistance and lubricative alumilite film is processed on a fixed shaft (see Japanese Laid Open Patent No. 1988-235719), lubricant of a perfluoropolyether (this is referred to as PFPE) group is coated on a ceramic material (Japanese Laid Open Patent No. 1992-808062), a resin including fluorine is coated on a metal for improving abrasion resistance (see Japanese Laid Open Patent No. 1989-65322) etc., and there have been bearing processing methods in which lubricity are previously added, as described above.

As first background solving methods, it is disclosed that a lubricant of low volatility is coated on at least one of the shaft and the bearing (see Japanese Laid Open Patent Nos. 1992-808062 and 1989-65322). However, in this method in which the lubricant is coated, the lubricant disappears from a rotating surface as rotation is repeated. As the typical lubricant, PFPE, PTFE, $MoS_2$, or BN is used. However, such a lubricative material has a serious disadvantage of a low abrasion resistance, and therefore the lubrication cannot be maintained for a long time period. Furthermore, it is disclosed recently that a plating in which such a material is dispersed is used as a surface processing (see Japanese Laid Open Patent Nos. 1986-112818 and 1991-186608, etc.). However, even if such a method is used, the shaft itself has lubrication, and therefore there is a disadvantage that processability is worsened and processing accuracy, which is necessary for high speed rotation, cannot be achieved.

Moreover, in a second solving method in which a high abrasion material is coated on uppermost surfaces of the shaft and the bearing, though ceramic is coated mainly, the filming method is divided into a dry process and a wet process (see Japanese Laid Open Patent Nos. 1986-282623 and 1988-8834, etc.). However, if a small size and low weight motor is developed and aluminum alloy is used as a base material, a limit becomes recognized in filming by the dry process. First, a low temperature process is obliged because of an aluminum base and a possibility that an adhering force is lower and an adhering state is worsened and becomes high. Moreover, since a hardness difference between a filmed ceramic and base material is large, a crack can be generated easily with contact. In order to solve this, thick filming is necessary. However, the dry process does not meet cost requirements. Furthermore, dry coating after plating is processed has been considered. However, this method is also disadvantageous in cost. Therefore, recently a method using an anode oxidized film is disclosed (see Japanese Laid Open Patent Nos. 1992-277317 and 1992-140509, etc.). However, this method has a serious disadvantage that reproduction is impossible. Moreover, though hardness is high, thoroughness is low, and therefore large abrasion powder is easily generated which can directly cause a lock in a high accuracy motor where clearance between a shaft and a bearing is only around 10 $\mu$m. In a third solving method, though magnetic liquid is used, fear that oil leak is generated and pollution of a polygon mirror is generated is not denied.

SUMMARY OF THE INVENTION

Accordingly, one object of the present invention is to provide a self-acting air bearing which has high abrasion resistance, low frictional coefficient and better processability.

These and other objects and advantages of the present invention are achieved by the present invention which provides a novel self-acting air bearing in which an abrasion-generated substance generated by rotation of a shaft and a bearing is used as a lubricant, whereby a motor of low cost and stable rotation in which it is not necessary to insert special lubricant into the shaft or the bearing previously can be achieved. Moreover, in a polygon motor having such a lubrication structure, since there is no fear of polluting the writing system, reliability for a long time period can be obtained.

Moreover, these and other objects and advantages are also achieved by the present invention which provides a novel self-acting air bearing in which the material of the shaft and the bearing generate an abrasion-generated substance in lower shearing strength than of the shaft and the bearing in generating the lubricant, whereby the lubricative abrasion-generated substance can be generated.

BRIEF DESCRIPTION OF THE DRAWINGS

In describing the preferred embodiments of the present invention illustrated in the drawings, specified terminology is employed for the sake of clarity. However, the present invention is not intended to be limited to the specific terminology so selected, and it is to be understood that each specific element includes all technical equivalents which operate in a similar manner.

A more complete appreciation of the present invention and many of the attendant advantages thereof will be readily obtained as the same becomes better understood by reference to the following detailed description, particularly when considered in connection with the accompanying drawings, wherein.

DESCRIPTION OF THE PREFERRED EMBODIMENTS

Figure 1:
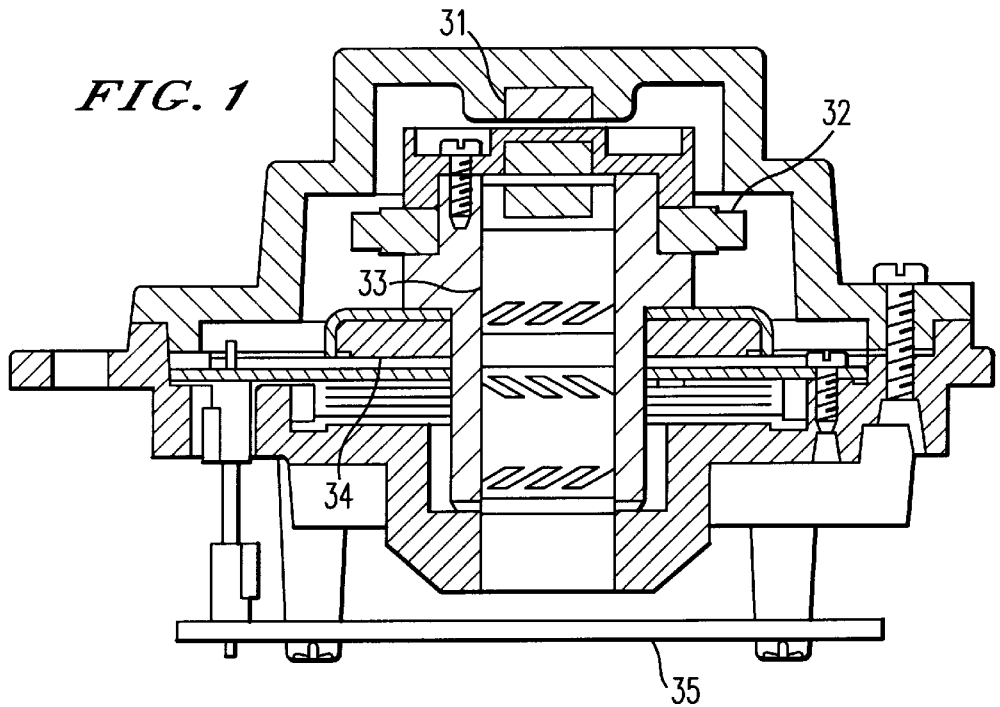
FIG. 1 is a block sectional view showing a polygon motor using the present invention.

Referring now to the figures, embodiments of the present invention will now be described.

In order to achieve the above objectives, in the present invention a substance generated by abrasion is used as a lubricant. As a result, when a polygon motor is designed, the present invention has a structure such that solid contact between a shaft and a bearing generates abrasion and an abrasion powder grows, and the composition of the abrasion substance is determined by the shaft, the bearing and an atmosphere of the air bearing. Then, in the present invention an abrasion-generated substance having lubricity can be produced by proper selection of the combination of these three conditions, i.e. the generated abrasion powder can be used as a lubricant. Thus, the present invention provides lubrication in such an air bearing.

As an abrasion resistance of the shaft and the bearing is higher, an amount of generated abrasion powder is smaller. However, it is necessary that the abrasion powder is lower in shearing strength than the shaft and the bearing so that generated abrasion powder can have lubricity. If a contrary relationship exists and the abrasion powder has a greater shearing strength than the shaft and bearing, when the abrasion powder adhered to the shaft and the bearing is sheared by the rotation, breakage may be generated within the shaft and the bearing, and a large frictional resistance and growth of abrasion powder are caused, and therefore the lubricative state cannot be achieved.

A lubricative abrasion powder generated by the present invention, as analyzed by a surface analyzing apparatus such as SAM, XPS and EELS, should include a layer including oxygen and carbon. The thickness of such a layer may reach around 100 $\mu$m, and when a bond state thereof is analyzed, some of the abrasion powder are partially strongly bonded to the substance constituting the abrasion powder, and therefore it is proper to refer to an abrasion-generated substance rather than an abrasion powder. Moreover, as a density of mixed elements is high, low friction is achieved, and therefore it is thought that it caused low shearing strength that the mixed elements which prevent metallic bonding. In addition, these elements exist in an atmosphere, as they are generated from a substance which adheres to the shaft and the bearing. Thus, it is also a necessary condition for achieving a substance having lubricity that the substance exist in the atmosphere and adhere to at least one of the shaft and the bearing. Then, when generally it is considered that the abrasion powder grows in a state that it deposits at the side of the bearing, the abrasion powder receives the mixed elements from the contact area between the abrasion powder and the bearing, and therefore it is advantageous that a material which can easily adsorb a substance including carbon or oxygen is used as the bearing.

Since the abrasion substance takes in the adsorbate, and as a result changes into the lubricative abrasion-generated substance, it is therefore easily supposed that the abrasion powder which exists in the contact area has an optimum amount. When the amount generated from the atmosphere is constant, if the amount of the generated abrasion powder is too much or if the adhesive force between the abrasion powder and the bearing is too large, and therefore a large amount of the abrasion powder deposits between the shaft and the bearing, the density of the mixed elements decreases relatively, and therefore the lubricity cannot be achieved. Moreover, on the contrary, if the generated amount is too little, the lubricative generated substance becomes abraded, and therefore solid contact between the shaft and bearing starts again.

Thus, conditions for generating the lubricative abrasion-generated substance are as follows.

1. The abrasion-generated substance is lower in shearing strength than the shaft or the bearing.
2. The abrasion powder can take in oxygen or carbon from the atmosphere.
3. The generated amount of the abrasion powder can maintain an optimum level for its changing into the lubricative abrasion-generated substance.

The conditions from the viewpoint of physical property of the abrasion powder are described above. However, conditions from the viewpoint of reactivity (adhesion) will now be described.

As described above, in the present invention, it has been studied that an abrasion-generated substance is used as a lubricant, and as a result when the polygon motor is designed, the shaft and the bearing, and also the atmosphere, are important factors for determining the property of the abrasion-generated substance to be generated. Furthermore, the inventors of the present invention have recognized that it is necessary to control an average adhering force of the shaft and the bearing properly.

Though abrasion is generated by the solid contact of the shaft and the bearing, generally the bearing generates more abrasion amount than the shaft. Namely it can be recognized that the bearing decides the generated amount of the abrasion-generated substance. Therefore, much of the abrasion-generated substance adheres to the shaft and friction between the shaft and the bearing shifts to friction between the abrasion-generated substance on the shaft and the bearing. In this state, the following conditions must be satisfied so that the abrasion-generated substance can function as the lubricant.

1. The shaft is high in holding force to the abrasion generated substance.
2. The bearing is low in adhering force to the abrasion-generated substance.

With these factors, it is important to recognize that a rotating condition is in air and the abrasion generated substance reacts with the air and becomes often different from its previous state after the reaction with the air. Especially, when the abraded body includes metal, the tendency is remarkable. According to this fact, the bearing which is the abraded body is different in property from the abrasion-generated substance, and therefore the second condition of the above can be achieved. However, if metal is used as the bearing material simply, the abrasion-generated substance reacts with oxygen in the air and the oxide of the metal increases, and therefore the adhering force to the original metal becomes extremely high, and the frictional coefficient and the abrasion amount are high to the contrary.

Thus, in the present invention, it may be beneficial to control a chemical property of the surfaces of the shaft and the bearing by particle dispersion. The chemical property of the surfaces described here is average adhering force to the abrasion-generated substance. Regarding the particle dispersion, generally, a bulk effect that a high hardness fine particle suppresses proceeding dislocation is recognized as important. However in the present invention, in addition to this, the average adhering force between the shaft, the bearing and the abrasion-generated substance is controlled by making the dispersed particle low in adhering force to matrix metal and the oxide. Specifically, the following condition is added to the matrix metal and the dispersed particle.

Matrix: in order to change the average adhering force by the particle dispersion, it is necessary that the metal mainly constituting the matrix has a somewhat low adhering force to the oxide. If not, even though the particle is dispersed, the effect cannot be ensured.

In order to satisfy this condition, in the constituting metal, it is necessary that the there are a few empty orbits in outer electron orbits in the atomic structure. This is because the empty orbits in the outer electron orbits become a receptor of an electron and metal, including many which react easily with the oxide. In many metals, the outermost empty orbit is d high bond property of d orbit within a metallic bond having a low receptive property of an electron, and therefore a metal or noble metal of IB group or VIII group of Fe or Ni, etc. is used as such a metal.

Moreover, regarding how easily a metal becomes an oxide, a standard generation free energy can be used as a reference. This is largely negative, for instance, for aluminum, magnesium, titanium, vanadium or zirconium, etc., which react easily with oxygen or a substance including oxygen and generate the oxide. Thus, chemical properties of the surface of the bearing and the abrasion generated substance are almost the same, and therefore a large adhering force is generated. Accordingly, as the matrix, a material in which a metal having a large absolute value of the standard free energy for generating oxide as a main constituting element is not used.

Dispersed particle: since the adhesion of the matrix is decreased by the dispersed particle, it is necessary that the dispersed particle has a low adhesion to oxide or metal. This is achieved by using a ceramic of high covalent bond property. When the covalent bond property is low and iron bone property is high, a dispersed particle having a negative charge reacts with metal and one having a positive charge reacts with oxygen, and therefore the adhering force becomes large. As one material satisfying this condition, carbide (SiC, WC), nitride ($Si_3N_4$, TiN, AlN), or diamond is used. Moreover, when a compound material is used for the shaft, if the dispersed particle included in the abraded portion functions as an abrasive powder, there is a fear that baking is generated by abnormal proceeding of abrasion, and therefore the function as the abrasive powder must be suppressed. In order to achieve this, it is effective to make an average particle diameter small. Specifically, 5 $\mu$m or less is preferable and 1 $\mu$m or less is more preferable.

Next, more specific embodiments of the present invention will be described. FIG. 1 is sectional view showing a polygon motor using the present invention and numeral 31 designates a magnetic bearing, numeral 32 designates a polygon mirror, numeral 33 designates a self-acting air bearing, numeral 34 designates a motor, and numeral 31 designates a circuit board. In this polygon motor, as a non-contact bearing, the self-acting air bearing 33 is used in a radial direction and the magnetic bearing 31 is used in an axial direction, and therefore high speed rotation, low noise and high reliability (high accurate rotation and long life) are achieved.

Figure 2:
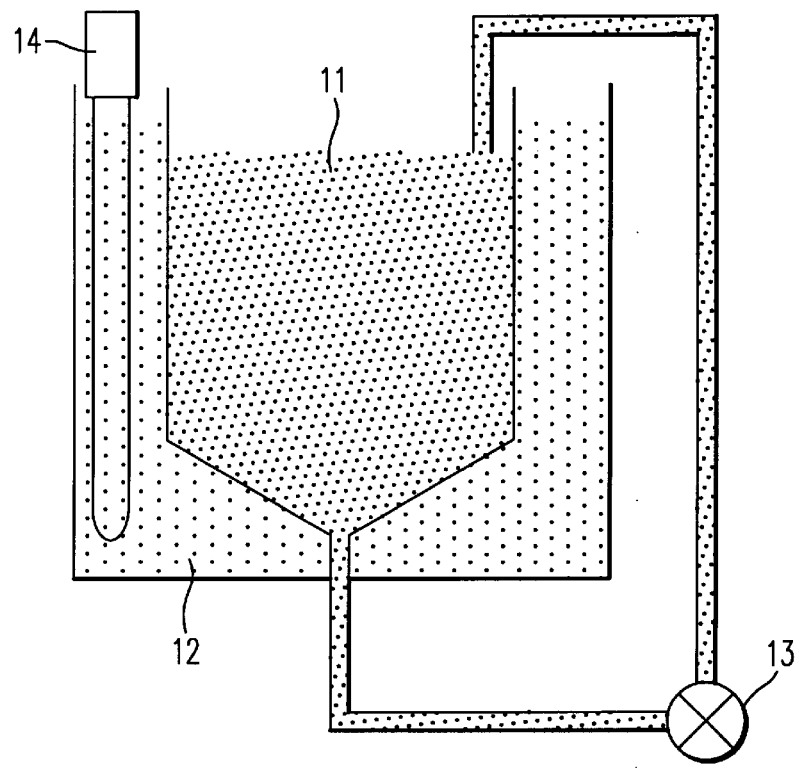
FIG. 2 is a conceptual view showing a plating container used for plating of a shaft and a bearing of a self-acting air bearing.

In order to satisfy the conditions described above, in this embodiment, a Ni—P electroless composite plating using SiC fine particles as dispersed particles is used. FIG. 2 shows a conceptual structure of a plating apparatus. Numeral 11 designates a plating bath, numeral 12 designates an oil bath, numeral 13 designates a circulation pump, and numeral 14 designates a heater.

Figure 3:
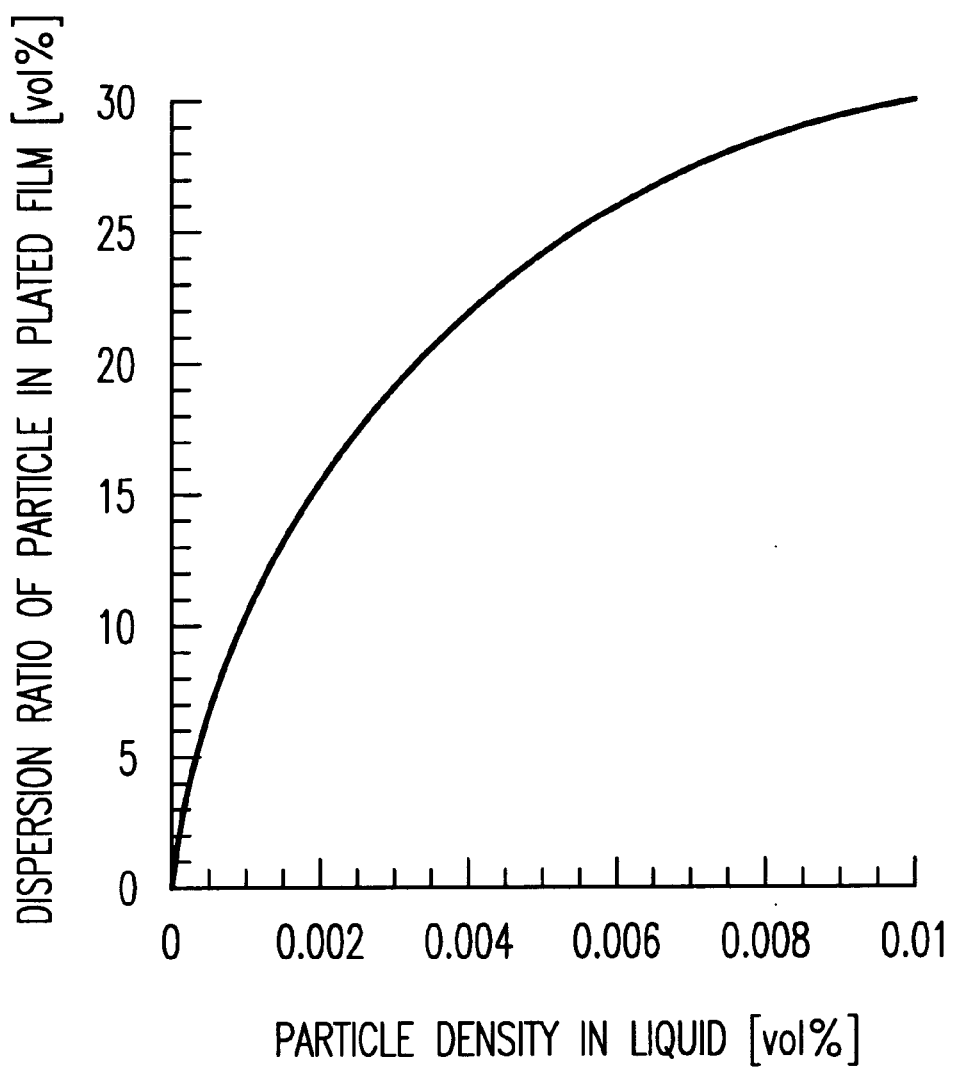
FIG. 3 shows a relation between a dispersion ratio in plated film and a particle density in liquid.

The electroless composite plating method has a merit that a dispersion ratio can be controlled easily in the process from a viewpoint of particle dispersion. When the plating apparatus in FIG. 2 is used, a relation between particle density in liquid and dispersion ratio in film is shown in FIG. 3. The relation between both can be described almost by Langmuir's equation.

SiC is a ceramic of an extremely high covalent bond and is equal to diamond of pure material. Thus, it has a high enough hardness to improve abrasion resistance. In addition to this, it is more stable at high temperatures than diamond. A contacting portion of the shaft and the bearing in the self-acting air bearing 33 when rotating may be at extremely high temperatures, and it is an important condition that the property does not change even at the high temperatures. Moreover, particularly SiC is cheaper, and thereby material cost can be reduced.

Furthermore, Ni has a high bond property of d orbit and the absolute value of the standard generation free energy is small. Thus, it is expected that sensitivity of the average adhering force to dispersion ratio of particle is high.

In this embodiment, some samples of the shaft and the bearing have been made in which a plating layer whose dispersion ratio is different is formed by a plating method, which have been assembled to the polygon motor, and a rotation experiment has been performed. The outline structure of the polygon motor at this time is the same as that shown in FIG. 1.

As a result, the following information has been obtained.

1. An abrasion-generated substance does not include the dispersed particle and is composed of a referred to denatured substance, which results from the matrix material reacting with oxygen and carbon adhering to the surface.
2. This deposits on the shaft mainly and rotation between the denatured substance and the bearing is done.
3. By controlling a denaturation degree of the denatured substance, stable rotation can be achieved.
4. By changing the dispersion ratio of the shaft and the bearing, a rotation property changes largely.
5. A combination of the dispersion ratios achieving good rotation exists.
6. By adding a material which changes the denaturation degree of the abrasion-generated substance and the adhesion degree to at least one of the shaft and the bearing previously, good rotation can be achieved.

Results of the fifth and the sixth properties will be described below. Table 1 shows experimental results of the dispersion ratio and the abrasion state of the shaft and the bearing. The values in the table indicate volume dispersion ratio (vol %) in plated film.

TABLE 1

| | Dispersion ratio and Abrasion state of the Shaft and the Bearing | | | | |
| --- | --- | --- | --- | --- | --- |
| | Shaft | | | | |
| Bearing | 0 | 5 | 10 | 15 | 25 |
| 0 | × | × | × | × | × |
| 5 | Δ | Δ | Δ | Δ | Δ |
| 10 | Δ | Δ | ○ | ○ | Δ |

TABLE 1-continued

| | Dispersion ratio and Abrasion state of the Shaft and the Bearing | | | | |
|---|---|---|---|---|---|
| | Shaft | | | | |
| Bearing | 0 | 5 | 10 | 15 | 25 |
| 15 | Δ | Δ | ◎ | ○ | ○ |
| 25 | Δ | Δ | Δ | ◎ | ○ |

◎: excellent ○: good Δ: fair ×: poor

As shown in the experimental results in Table 1, the conditions for obtaining good rotation are as follows.

(1) The dispersion ratio of the bearing is 10 vol % or more.

(2) The ratio of the dispersion ratios of the shaft and the bearing ((the volume dispersion ratio of the shaft)/(the volume dispersion ratios of the bearing)) is in a range between 0.7 and 1.4.

Namely, when the dispersion ratio of the bearing is low, the abrasion amount is great and a possibility of baking becomes high. Moreover, when the dispersion ratios of the shaft and the bearing are made to be close, holding of the abrasion-generated substance on the shaft is effective.

Furthermore, the ratio of the dispersion ratios of the shaft and the bearing ((the volume dispersion ratio of the shaft)/(the volume dispersion ratio of the bearing)) is made in the range between 0.7 and 0.9. Namely, by setting the dispersion ratio of the bearing a little higher, the degree of the denaturation of the abrasion-generated substance changes into a good direction and the stability on the shaft becomes high, and therefore stable rotation can be achieved.

The results described above indicate that controlling the denaturation degree of the abrasion-generated substance is most important. Thus, a method for controlling the denaturation degree actively can also be effectuated.

That is a method in which an organic substance is added to at least one of the shaft and the bearing as a material for causing the denaturation, before the rotation. Namely by starting the rotation, the organic substance is taken in the abrasion-generated substance, and a desired denaturation degree can be obtained by balance of the abrasion amount. This model is shown in FIG. 4.

Figure 4A:
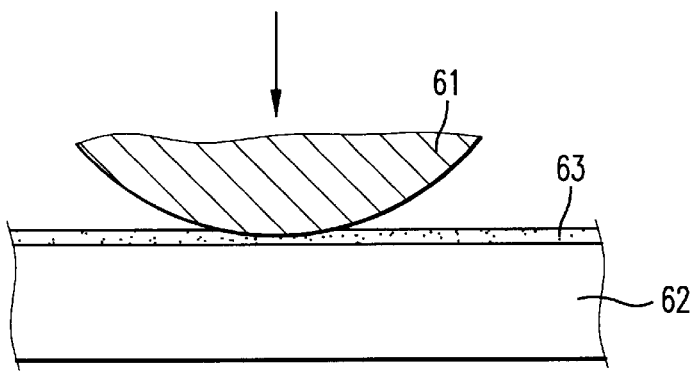
FIG. 4 shows a rotation model under a condition that a denature substance is added to a surface.
Figure 4B:
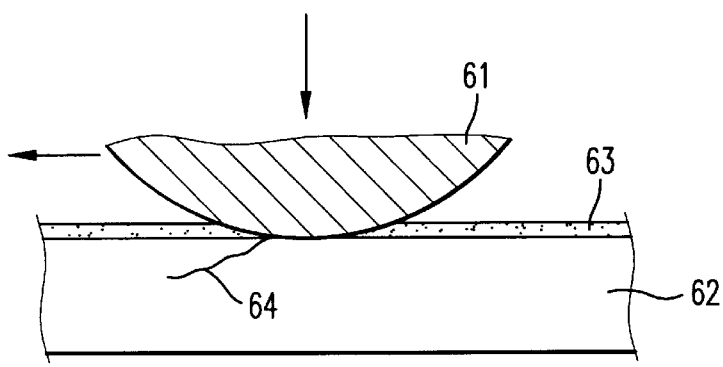
Figure 4C:
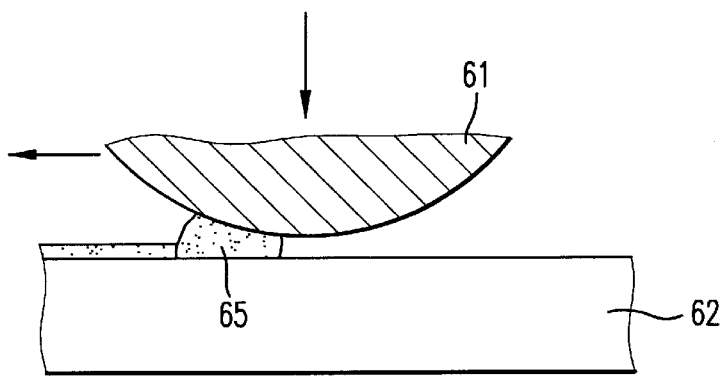
Figure 4D:
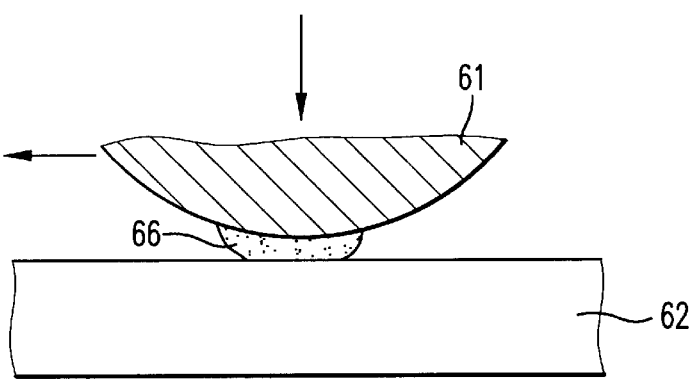

FIG. 4(a) indicates a state of a shaft 61, a bearing 62 and a denatured substance 63 (organic substance) before rotation, FIG. 4(b) indicates a state of a minute breakage (abrasion) of the bearing 62 generated by solid contact of the shaft 61 and the bearing 62 when the rotation starts, FIG. 4(c) indicates a state that the denatured abrasion-generated substance adheres to the shaft 61 after the rotation starts, and FIG. 4(d) indicates a state of the denatured abrasion-generated substance 66 adhering to the shaft 61 while rotating, such that the denatured abrasion-generated substance 66 adhering to the shaft 61 functions as lubricant while shaft 61 is rotating.

An important factor is to make the necessary minimum amount of the organic substance so the denatured substance adheres to the surface strongly. If the adhesion is not strong enough, there is a fear that this substance volatizes and adheres to the surface of the polygon mirror. Thus, in this embodiment, perfluoropolyether (this is referred to as PFPE hereinafter) which has a low vapor pressure in organic substances is used. A filming method can be utilized in which the shaft and/or the bearing are dipped into a solution of perfluoroalane, where PFPE is dispersed a little as being supplied by ultrasonic shock waves, and after that they are dipped again into the perfluoroalane and are cleaned for removing the PFPE which does not have a strong enough adhesive state.

In this state, the thickness of the adhering layer may be a little uneven, and therefore one whose at least one end, and preferably both ends, is modified by a functional group having π orbit or lone electron-pair such as OH group, C=O group, ether bond, or double bond, etc., may be preferable. Thereby the adhesion of PFPE is improved and the adhering unevenness is decreased.

After PFPE whose both ends were modified by carboxyl group was processed to the shaft and the bearing of a dispersion ratio of 13 vol % of which the rotation was more stable under these conditions, a rotation experiment was performed. As a result, the adhering amount necessary for the denaturation of the abrasion generated substance was secured and the same state as the extremely good rotation state which was obtained by the dispersion ratio controlling was achieved.

Finally, the technical advantages of the present invention will now be further described.

According to the present invention, the abrasion-generated substance which is generated by the rotation of the shaft and the bearing is used as a lubricant in the self-acting air bearing, whereby a motor of low cost and stable rotation, and in which it is not necessary to insert special lubricant into the shaft or the bearing previously, can be achieved. Moreover, in the polygon motor having such a lubrication structure, since polluting of the writing system is not feared, reliability for a long time period can be obtained.

According to the present invention, the material of the shaft and the bearing is designed to generate the abrasion-generated substance of a lower shearing strength than the shaft and the bearing for generating the lubricant, whereby the lubricative abrasion-generated substance can be generated.

According to the present invention, the material of the shaft and the bearing is designed to control the abrasion amount of the abrasion powder for generating the lubricant, whereby the condition for generating the lubricative abrasion-generated substance stably can be controlled.

According to the present invention, as the atmosphere between the shaft and the bearing for generating the lubricant, a substance including at least one of oxygen and carbon, preferably both, which adheres strongly to the material of at least one of the shaft and the bearing, preferably both, exists in the atmosphere such that the abrasion powder takes in this substance, whereby the lubricative abrasion-generated substance can be generated.

According to the present invention, the average adhering force is controlled so that the abrasion substance generated by the rotation of the shaft and the bearing can function effectively as the lubricant, whereby a motor of low cost and stable rotation, and in which it is not necessary to insert special lubricant into the shaft or the bearing previously, can be achieved. Moreover, in the polygon motor having such a lubrication structure, since polluting the writing system is not feared, reliability for a long time period can be obtained.

According to the present invention, the compound material including a dispersion particle, which is much different in hardness from the matrix metal and is low in wettability to the matrix or its oxide, is used as the material of the shaft and the bearing generating the lubricant, whereby the lubricative abrasion-generated substance can be generated effectively.

According to the present invention, the compound material is mainly composed of a metal of high d bond property, for instance VIII group of Fe, Ni, Co or Pt, etc., of the metal of IB group or tungsten etc., is used as the matrix of the compound material, whereby the average adhering force can be controlled.

According to the present invention, the compound material is mainly composed of a metal of high absolute value of standard free energy for generating the oxide, for instance Al, V, Zr, Ti, or Mg, etc., is not used as the matrix of the compound material, whereby the abrasion powder is not easily oxidized, and therefore the average adhering force can be maintained low to a degree capable of being controlled by the dispersion particle.

According to the present invention, a ceramic of low ionic bond property and high covalent bond property, for instance Sic, $Si_3N_4$, BN, AlN, WC, TiN, TICN or diamond, etc., is used as the dispersion material of the compound material, whereby the average adhering force and the abrasion resistance can be controlled.

According to the present invention, the average particle diameter of the dispersion particle is 5 μm or less, preferably 1 μm or less, whereby the function of the dispersion particle as the abrasive powder can be suppressed and a problem that the dispersion particle has high abrasion resistance and causes baking can be solved.

According to the present invention, a Ni—P electroless composite plating in which SIC is used as the dispersion particle is used as the material of the shaft and the bearing, and the volume dispersion ratio in the plating film is controlled by the particle density in the plating liquid during filming, whereby the above conditions can be well controlled.

According to the present invention, the following two conditions are satisfied as the dispersion ratio in the plated film of the shaft and the bearing.

1) The volume dispersion ratio in the plated film of the bearing is 10% or more.
2) The ratio of the dispersion ratios in the plated films of the shaft and the bearing ((the volume dispersion ratio of the shaft)/(the volume dispersion ratio of the bearing)) is in the range between 0.7 and 1.4.

Thereby a lubricative abrasion-generated substance having a stable state can be generated.

According to the present invention, especially if the ratio of the dispersion ratios in the plated films of the shaft and the bearing is set from 0.7 to 0.9, the lubricative abrasion-generated substance has an extremely stable friction state.

According to the present invention, in the self-acting air bearing perfluoropolyether is previously filmed on at least one of the shaft and the bearing, preferably both, and then the rotation starts, whereby the range of the dispersion ratios of the shaft and the bearing which generates the lubricative abrasion-generated substance having extremely stable friction state can be widened largely.

According to the present invention, a polyether in which the functional group having π orbit or lone electron-pair of OH group, C=O group, ether group or double bond, etc., exists at least at one end, and preferably at both ends, is used, whereby the lubricative abrasion-generated substance having extremely stable friction state can be generated.

According to the present invention, as the filming method of the polyether, the shaft and/or the bearing is dipped and simultaneously shocked by ultrasonic waves in the solution in which the polyether is dispersed in perfluoroalkane and then the shaft and/or the bearing is dipped again, whereby the volatility of the polyether can be prevented and a problem that the volatized polyether pollutes the polygon mirror etc. in the writing system can be prevented.

obviously, additional numerous modifications and variations of the invention are possible in light of the above teachings. It is therefore to be understood that, within the scope of the claims the invention may be practiced otherwise than as specifically described herein.

What is claimed as new and desired to be secured by Letters Patent of the United States is:

1. A self-acting air bearing apparatus comprising:
a shaft;
a bearing installed around the shaft;
wherein one of the shaft and the bearing rotates with respect to the other and rotation generates dynamic air pressure; and
wherein an abrasion-generated substance is generated by solid contact of the shaft and the bearing and by rotation between the shaft and the bearing, the abrasion-generated substance forming a lubricant between the shaft and the bearing;
wherein a compound material including a dispersion particle, different in hardness from a matrix and lower in wettability than the matrix or an oxide of the matrix, is used as a material of the shaft and the bearing to generate the lubricant effectively;
wherein a Ni—P electroless composite plating where SiC is used as the dispersion particle is used as a material of the shaft and the bearing, and a volume dispersion ratio in plated film is controlled by particle density in plating liquid during filming, and
wherein the following two conditions are satisfied as the dispersion ratio in the plated film of the shaft and the bearing:
1) the volume dispersion ratio in the plated film of the bearing is 10% or more;
2) a ratio of the dispersion ratios in the plated films of the shaft and the bearing, (the volume dispersion ratio of the shaft)/(the volume dispersion ratio of the bearing), is in a range between 0.7 and 1.4.

2. The self-acting air bearing apparatus of claim 1, wherein the abrasion-generated substance has a lower shearing strength than the shaft and the bearing.

3. The self-acting air bearing apparatus of claim 2, wherein an atmosphere between the shaft and the bearing includes at least one of oxygen and carbon, and the abrasion-generated substance takes in the least one of the oxygen and carbon.

4. The self-acting air bearing apparatus of claim 1, wherein a material of the shaft and the bearing is designed to control a generated amount of the abrasion-generated substance.

5. The self-acting air bearing apparatus of claim 1, wherein a metal material mainly composed of a metal of high d bond property or a metal of IB group is used as the matrix of the compound material.

6. The self-acting air bearing apparatus of claim 5, wherein the metal material is selected from the group consisting of Fe, Ni, Co, Pt and tungsten.

7. The self-acting air bearing apparatus of claim 1, wherein a metal material mainly composed of a metal of high absolute value of standard free energy for generating the oxide is not used as the matrix of the compound material.

8. The self-acting air bearing apparatus of claim 7, wherein the metal material is selected from the group consisting of Al, V, Zr, Ti and Mg.

9. The self-acting air bearing apparatus of claim 7, wherein a ceramic of low ionic bond property and high covalent bond is used as the dispersion material of the compound material.

10. The self-acting air bearing apparatus of claim 9, wherein the ceramic is selected from the group consisting of SiC, $Si_3N_4$, BN, AlN, Wc, TiN and TiCN.

11. The self-acting air bearing apparatus of claim 7, wherein an average particle diameter of the dispersion particle is 5 µm or less.

12. The self-acting air bearing apparatus of claim 1, wherein the ratio of the dispersion ratios in the plated films of the shaft and the bearing is in a range between 0.7 and 0.9.

13. The self-acting air bearing apparatus of claim 1, wherein perfluoropolyether is filmed on at least one of the shaft and the bearing.

14. A self-acting air bearing apparatus of claim 13, wherein the perfluoropolyether has a functional group selected from the group consisting of having $\pi$ orbit, lone electron-pair of OH group, C=O group, ether group and double bond, at least at one end.

15. A self-acting air bearing apparatus of claim 14, wherein the perfluoropolyether is filmed on the shaft, the bearing being dipped and simultaneously shocked by ultrasonic waves in solution where the polyether is dispersed in perfluoroalkane.

* * * * *